(No Model.)  2 Sheets—Sheet 1.

A. BUEL.
DRIER.

No. 343,755.  Patented June 15, 1886.

WITNESSES:
Cornett Reemer
C. Sedgwick

INVENTOR:
A. Buel
BY Munn & Co
ATTORNEYS.

(No Model.)
2 Sheets—Sheet 2.
A. BUEL.
DRIER.
No. 343,755.
Patented June 15, 1886.
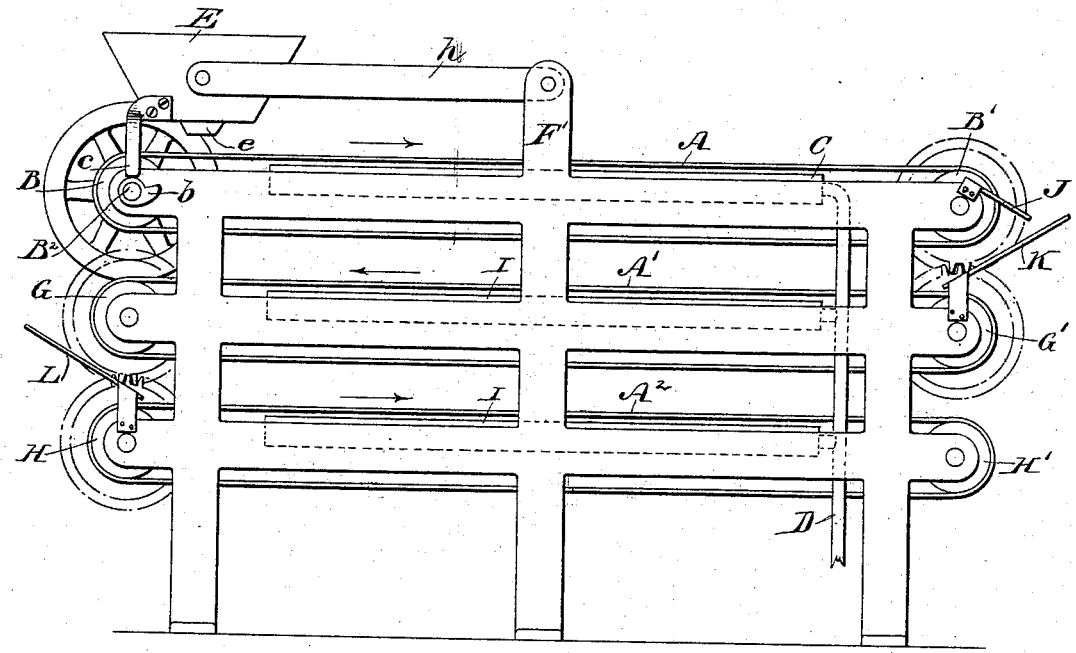
WITNESSES:
INVENTOR:
A. Buel
BY Munn & Co
ATTORNEYS.

UNITED STATES PATENT OFFICE.

ARTHUR BUEL, OF NEW YORK, N. Y.

DRIER.

SPECIFICATION forming part of Letters Patent No. 343,755, dated June 15, 1886.

Application filed September 26, 1885. Serial No. 178,299. (No model.)

*To all whom it may concern:*

Be it known that I, ARTHUR BUEL, of the city, county, and State of New York, have invented a new and Improved Drying Apparatus, of which the following is a full, clear, and exact description.

My invention relates to an apparatus designed more especially for drying white lead and other pigments or comminuted pasty substances; and the invention consists, principally, of means for depositing the substance to be dried in small cones or hillocks upon a traveling belt or apron to which heat is applied, so that the substance will be dried in small homogeneous lumps or balls that can be handled without waste and without filling the air with fine particles or fumes of the dried material.

The invention also consists of the employment of a number of drying belts or aprons arranged in vertical series, so the material will discharge from one belt to the other while being dried, thus economizing space and heat; and the invention also consists of the special construction, arrangement, and combination of parts, all as hereinafter described and claimed.

Reference is to be had to the accompanying drawings, forming a part of this specification, in which similar letters of reference indicate corresponding parts in all the figures.

Figure 1:
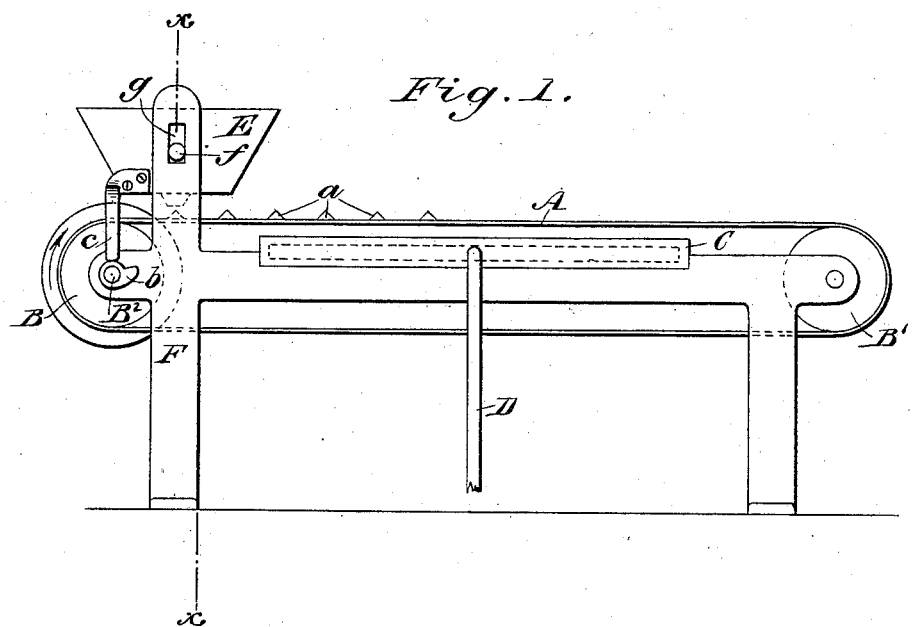
Figure 2:
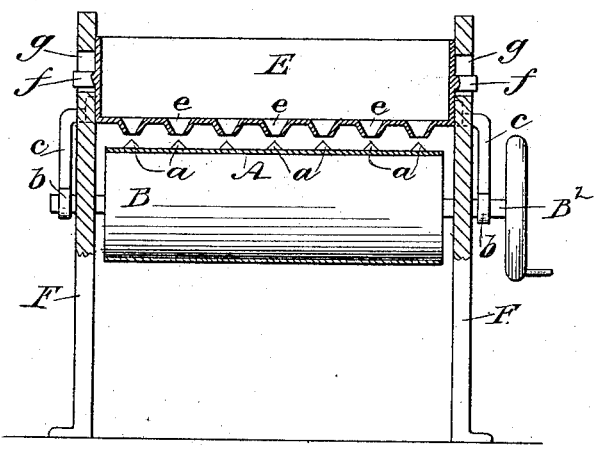

Figure 1 is a side elevation of a pigment-drier made in accordance with my invention with but one drying-belt. Fig. 2 is a transverse sectional elevation of the same, taken on the line $xx$ of Fig. 1; and Fig. 3 is a side elevation of a drier having several drying-belts, and showing also a modified arrangement of the hopper.

A represents an endless belt or apron placed upon the drums B B', one of which may be revolved by hand or other power for causing the belt A to travel slowly. The belt A is heated in this instance by hot air or steam supplied to the table or chamber C through pipe D, and the pigment or other material to be dried is supplied to the upper surface of the belt A in small cones or piles $a$ from the hopper E, which has a series of openings, $e$, made in its bottom, and is given an up-and-down motion for that purpose.

In Figs. 1 and 2 the hopper E is held by the trunnions $f$ in the slots $g$ in the uprights F of the main frame of the drier, and is given a slow upward and a sudden drop or downward motion by means of the cams or tappets $b$ on the drive shaft $B^2$, which cams or tappets turn in contact with arms $c$, attached to the hopper.

In Fig. 3, while the hopper is given an up-and-down motion, the same as in Figs. 1 and 2, its hopper is not held in slots, but is attached to central uprights, F', of the main frame by pivoted arms $h$, which permit the hopper to be lifted by the cams or tappets, so the hopper will drop by its own gravity at intervals, to cause the material in the hopper to be jarred through the opening $e$ and deposited in small cones or hillocks upon the apron A.

The drop motion of the hopper may be accomplished in various other ways, and in order to cause the material to be dropped in perfectly-formed cones the outlets $e$ are made conical, as shown clearly in Fig. 2.

In Fig. 3, beneath the belt A is placed the endless belt A', and beneath the latter is placed the belt $A^2$. The belt A' is placed upon the drums G G', the belt $A^2$ upon the drums H H', and the shaft of the drum B' at the top of the apparatus is geared to the shaft of the drum G', and the shaft of drum G is geared to the shaft of the drum H, so that the belts all receive reverse motion from one and the same power-shaft. The belts A' $A^2$ are both heated, the same as the upper belt, A, by heating-chambers I, placed within them. The belt A will be moved at such a rate of speed that the cones of wet material deposited upon it will become set or hard enough to retain their shape before passing to the lower belt; and for detaching the cones from the belt A I provide it at its outer end with the scraper J, and below the scraper I place the inclined board K, for guiding the cones of partially-dried material as they drop from belt A to and upon the belt A'. No scraper is needed at the end of the belt A'; but an inclined board, L, like K, is placed at the end of this belt to guide the small balls of material as they drop from belt A' to the lower belt, $A^2$. Where a single belt A is used, as in Figs. 1 and 2, it must be made of considerable length, so that the material will become throughly dried before reaching the drum B'. I do not confine myself to any definite number of drying-belts in the arrangement shown in Fig. 3. By depositing the pasty material in small cones or hillocks through the openings $e$, due to giving the hopper a "drop" motion, as described, it subdivides the material into small quantities, so that less heat is required in drying, and the material being dried in small cones or balls, there is no loss of material or annoyance from particles floating in the air, and the material as it leaves the drier is in convenient shape to handle.

Having thus described my invention, what I claim as new, and desire to secure by Letters Patent, is—

1. In a drying apparatus, an endless drying-belt and a hopper having holes in its bottom, combined with means, substantially as described, for lifting and dropping the hopper for depositing the material to be dried in small cones or hillocks upon the drying-belt, substantially as and for the purposes set forth.

2. The endless traveling drying-belt A, placed upon drums arranged at the ends of the main frame, and adapted to be revolved for moving the belt, in combination with the hopper E, pivoted arms $h'$, cams or tappets $b$, and arms $c$, the hopper being formed with the series of holes $e$, substantially as and for the purposes set forth.

3. In a drying apparatus, the series of drying-belts A A' A$^2$, placed one above the other on drums arranged at opposite ends of the main frame, and adapted to move the belts in reverse directions, in combination with the hinged hopper E, shaft B$^2$, cam $b$, and projection on the hopper for giving the latter a drop motion, substantially as described.

ARTHUR BUEL.

Witnesses:
H. A. WEST,
EDGAR TATE.